(12) United States Patent
Venkatesha et al.

(10) Patent No.: US 9,740,932 B2
(45) Date of Patent: *Aug. 22, 2017

(54) CROSS-SENSOR IRIS MATCHING

(71) Applicant: Honeywell International Inc., Morristown, NJ (US)

(72) Inventors: Sharath Venkatesha, Minnetonka, MN (US); Scott McCloskey, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/947,611

(22) Filed: Nov. 20, 2015

(65) Prior Publication Data

US 2016/0078294 A1    Mar. 17, 2016

Related U.S. Application Data

(63) Continuation of application No. 13/864,934, filed on Apr. 17, 2013, now Pat. No. 9,224,042.

(51) Int. Cl.
*H04N 7/18* (2006.01)
*H04N 9/47* (2006.01)
*G06K 9/00* (2006.01)

(52) U.S. Cl.
CPC ....... *G06K 9/00617* (2013.01); *G06K 9/0061* (2013.01); *G06K 9/00604* (2013.01)

(58) Field of Classification Search
CPC ........... G06K 9/00604; G06K 9/00617; G06K 9/00597

USPC ........... 348/78, 77, 61, 211.9, 222.1, 224.1; 382/117, 115, 118, 312; 725/12

See application file for complete search history.

(56) References Cited

U.S. PATENT DOCUMENTS

| | | | |
|---|---|---|---|
| 8,064,647 B2 | 11/2011 | Bazakos et al. | |
| 8,948,467 B2 | 2/2015 | Bedros et al. | |
| 9,530,052 B1* | 12/2016 | Pillai | G06K 9/00617 |
| 2005/0270386 A1 | 12/2005 | Saitoh et al. | |
| 2008/0181467 A1* | 7/2008 | Zappia | G06K 9/00604 |
| | | | 382/117 |
| 2010/0208951 A1* | 8/2010 | Williams | G06K 9/2018 |
| | | | 382/117 |
| 2012/0188336 A1* | 7/2012 | Ogasahara | H04N 13/0025 |
| | | | 348/43 |
| 2012/0207357 A1 | 8/2012 | Bedros et al. | |

(Continued)

OTHER PUBLICATIONS

Daugman, "High Confidence Visual Recognition of Persons by a Test of Statistical Independence", IEEE Transactions on Pattern Analysis and Machine Intelligence, vol. 15, No. 11, Nov. 1993 (14 pgs.).

*Primary Examiner* — Brian Yenke
*Assistant Examiner* — Jean W Desir
(74) *Attorney, Agent, or Firm* — Brooks, Cameron & Huebsch, PLLC (57) ABSTRACT

Methods, devices, and systems for cross-sensor iris matching are described herein. One method includes capturing a first image of an iris using a first sensor, capturing a second image of an iris using a second sensor, and determining whether the iris in the first image matches the iris in the second image based on characteristics of the first sensor and the second sensor and image quality of the first image and the second image.

18 Claims, 3 Drawing Sheets

(56) References Cited

U.S. PATENT DOCUMENTS

2013/0162799 A1\* 6/2013 Hanna .................... A61B 5/117
                                                    348/78
2013/0266193 A1\* 10/2013 Tiwari ............... G06K 9/00771
                                                    382/115

\* cited by examiner

CROSS-SENSOR IRIS MATCHING

CROSS REFERENCE TO RELATED APPLICATION

This application is a continuation of U.S. application Ser. No. 13/864,934, filed Apr. 17, 2013, the entire specification of which is incorporated herein by reference.

TECHNICAL FIELD

The present disclosure relates to methods, devices, and systems for cross-sensor iris matching.

BACKGROUND

Ocular recognition can utilize periocular images (e.g., images of an iris and surrounding ocular regions of the eye) to identify a subject (e.g., person). For example, known periocular images (e.g., target images stored in a database) can be compared (e.g., matched) to an unknown periocular image (e.g., a probe image) to determine if the probe image has the same subject as any of the target images. For instance, the target images can be compared to the probe image to determine whether the iris in the probe image matches any of the irises in the target images, thereby identifying the subject in the probe image.

The matching of the probe image and the target images can be effectively performed utilizing various processes (e.g., algorithms) when the probe and target images are captured using the same sensor. However, such processes may not be able to effectively match the probe image and the target images, and accordingly may not be able to effectively (e.g., accurately) determine whether the iris in the probe image matches any of the irises in the target images, when the probe and target images are captured using different sensors (e.g., different types of sensors). For example, such processes may not be able to effectively match a probe image and a target image when one of the images is captured using a close range sensor (e.g., a sensor configured to capture an image of a subject that is less than one meter from the sensor) and the other image is captured using a far range sensor (e.g., a sensor configured to capture an image of a subject that is one to ten meters from the sensor).

DETAILED DESCRIPTION

Methods, devices, and systems for cross-sensor iris matching are described herein. For example, one or more embodiments include capturing a first image of an iris using a first sensor, capturing a second image of an iris using a second sensor, and determining whether the iris in the first image matches the iris in the second image based on characteristics of the first sensor and the second sensor and image quality of the first image and the second image.

Methods, devices, and systems for cross-sensor iris matching in accordance with the present disclosure can effectively match periocular images (e.g., probe and target periocular images) captured by different sensors (e.g., different types of sensors). For instance, methods, devices, and systems for cross-sensor matching in accordance with the present disclosure can effectively match periocular images when one of the images is captured using a close range sensor (e.g., a sensor configured to capture an image of a subject that is less than one meter from the sensor) and the other image is captured using a far range sensor (e.g., a sensor configured to capture an image of a subject that is one to ten meters from the sensor). Accordingly, methods, devices, and systems for cross-sensor matching in accordance with the present disclosure can effectively (e.g., accurately) determine whether the irises in the periocular images captured by the different sensors match, thereby effectively (e.g., accurately) identifying the subject (e.g., person) in the images.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, mechanical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of sensors" can refer to one or more sensors. Additionally, the designator "N" as used herein, particularly with respect to reference numerals in the drawings, indicates that a number of the particular feature so designated can be included with a number of embodiments of the present disclosure.

Figure 1:
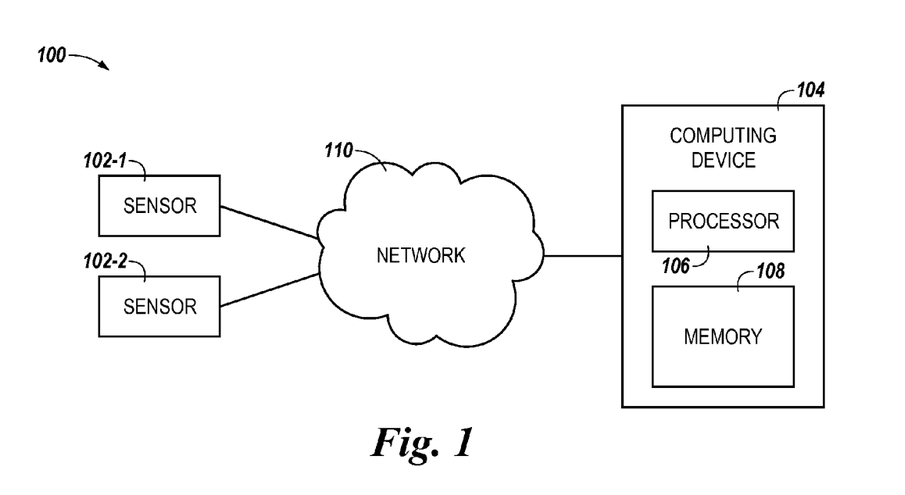
FIG. 1 illustrates a system for cross-sensor iris matching in accordance with one or more embodiments of the present disclosure.

FIG. 1 illustrates a system 100 for cross-sensor iris matching in accordance with one or more embodiments of the present disclosure. As shown in FIG. 1, system 100 can include sensors 102-1 and 102-2. Although the embodiment illustrated in FIG. 1 includes two sensors, embodiments of the present disclosure are not so limited (e.g., in some embodiments, system 100 can include more than two sensors).

Sensors 102-1 and 102-2 can be iris acquisition sensors (e.g., any type(s) of sensor(s) capable of capturing and/or acquiring an image of an iris). That is, sensors 102-1 and 102-2 can capture images of irises (e.g., sensor 102-1 can capture a first image of an iris and sensor 102-2 can capture a second image of an iris). For instance, sensors 102-1 and 102-2 can capture known (e.g., target) and/or unknown (e.g., probe) periocular images (e.g., images of an iris and surrounding ocular regions of the eye) of a subject (e.g., person). The target images captured by sensors 102-1 and 102-2 can be stored in a database (not shown in FIG. 1). Further, sensors 102-1 and 102-2 can be close range sensors (e.g., configured to capture periocular images of a subject who is less than one meter from the sensor) and/or far range sensors (e.g., configured to capture periocular images of a subject who is one to ten meters from the sensor).

As shown in FIG. 1, system 100 can include a computing device 104. Computing device 104 can be, for example, a laptop computer, a desktop computer, or a mobile device (e.g., a mobile phone, a personal digital assistant, a tablet, etc.), among other types of computing devices.

As shown in FIG. 1, computing device 104 can include a processor 106 and a memory 108. As will be appreciated by one of ordinary skill in the art, computing device 104 can also include additional elements and/or components not shown in FIG. 1 for clarity and so as not to obscure embodiments of the present disclosure. For example, computing device 104 can include a user interface and/or a network interface, among other additional elements and/or components.

Memory 108 can be any type of storage medium that can be accessed by processor 106 to perform various examples of the present disclosure. For example, memory 108 can be a non-transitory computer readable medium having computer readable instructions (e.g., computer program instructions) stored thereon that are executable by processor 106 to perform cross-sensor iris matching in accordance with one or more embodiments of the present disclosure.

Memory 108 can be volatile or nonvolatile memory. Memory 108 can also be removable (e.g., portable) memory, or non-removable (e.g., internal) memory. For example, memory 108 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 108 is illustrated as being located in computing device 104, embodiments of the present disclosure are not so limited. For example, memory 108 can also be located internal to another computing resource (e.g., enabling computer readable instructions to be downloaded over the Internet or another wired or wireless connection).

Computing device 104 and sensors 102-1 and 102-2 can be coupled (e.g., communicate) via a network 110, as illustrated in FIG. 1. For example, computing device 104 can receive information (e.g., data and/or images) from sensors 102-1 and 102-2 via network 110.

Network 110 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 110) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 110 can tie a number of computing devices together to form a distributed control network (e.g., permit a mobile device to connect to a server that connects with a building management system).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As an example, sensor 102-1 can capture a first image of an iris and sensor 102-2 can capture a second image of an iris. The first image can be, for example, a target periocular image, and the second image can be, for example, a probe periocular image. Computing device 104 can then compare the iris from the first image to the iris from the second image to determine whether the iris in the first image matches the iris in the second image. If the two irises match, computing device 104 can identify the subject (e.g., person) in the images (e.g., computing device 104 can identify the unknown person in the probe image as the known person in the target image). If the two irises do not match, computing device 104 may not be able to identify the person in the probe image. In such an instance, computing device 104 can compare the iris from the probe image to additional irises from additional target periocular images captured by sensor 102-1 and/or additional sensors (not shown in FIG. 1), and determine whether the iris from the probe image matches any of the additional irises to identify the unknown person.

Computing device 104 can determine whether the iris in the first image matches the iris in the second image based on (e.g., using) the characteristics of sensors 102-1 and 102-2, and the image quality (e.g., image quality parameters) of the first and second images. For example, computing device 104 can account for (e.g., reconcile) the difference(s) between the characteristics of sensors 102-1 and 102-2, account for the difference(s) between the image quality of the first and second images, and determine whether the iris in the first image matches the iris in the second image after accounting for the difference(s) between the characteristics of sensors 102-1 and 102-2 and the difference(s) between the image quality of the first and second images.

The characteristics of sensors 102-1 and 102-2 can include optical characteristics of the sensors, such as, for instance, the resolution(s) of the sensors. The image quality (e.g., image quality parameters) of the first and second images can include, for example, the amount of blur in the images, the amount of dilation in the irises in the images, the contrast and/or sharpness of the images, the amount of occlusion in the images, and/or the amount of illumination in the image.

As an example, computing device 104 can normalize the first image and the second image based on the characteristics of sensors 102-1 and 102-2. This normalization can be a pre-processing step and/or part of a calibration procedure, for example. Computing device 104 can then match the iris in the first image and the iris in the second image for a plurality of frequency bands, and fuse the matched irises for each frequency band using the image quality of the first and second images to determine a score fusion for all frequency bands. The irises can be matched using, for example, Gabor frequency band matching (e.g., in the Gabor domain), among other methods. Computing device 104 can then determine whether the iris in the first image matches the iris in the second image based on the normalized images and the score fusion for all the frequency bands.

Computing device 104 can account for the difference(s) between the characteristics of sensors 102-1 and 102-2 (e.g., normalize the first and second images) by determining (e.g., calculating and/or characterizing) a modulation transfer function of sensor 102-1, determining a modulation transfer function of sensor 102-2, and transforming the first image and the second image such that the transformation corresponds to matching the modulation transfer function of sensor 102-1 and the modulation transfer function of sensor 102-2 (e.g., to equalize the frequency content between sensors 102-1 and 102-2). The modulation transfer function of a sensor can be, for example, a measurement of the ability of the sensor to resolve detail in the subject of an image captured by the sensor, such as, for instance, the amount of contrast from the subject to the image the sensor is capable of maintaining at different levels of image detail. An example of modulation transfer functions and a transformation of images that corresponds to matching modulation transfer functions will be further described herein (e.g., in connection with FIG. 2).

The modulation transfer function of sensor 102-1 can be determined by, for example, capturing a plurality of images of a calibration target using sensor 102-1. The modulation transfer function of sensor 102-2 can be determined by, for example, capturing a plurality of images of the calibration target using sensor 102-2.

In some embodiments, transforming the first image and the second image can include blurring and/or sharpening the first image in different frequency bands of sensor 102-1 and/or the second image in corresponding frequency bands of sensor 102-2. For example, the image captured by the sensor having the lower of the two modulation transfer functions can be sharpened to match the image captured by the sensor having the sharper modulation transfer function, and/or the image captured by the sensor having the sharper of the two modulation transfer functions can be blurred to match the image captured by the sensor having the lower modulation transfer function.

In some embodiments, the first image and the second image can be divided into a plurality of corresponding frequency (e.g., spatial frequency) bands, and the first image and the second image can be matched over a single (e.g., only) one of the frequency bands. That is, in such embodiments, the entire images may not be matched; rather, only a portion of the images (e.g., the portion in the single frequency band) may be matched. For example, an iris template can be generated for each of the frequency bands, a weight can be defined for each of the frequency bands, and the set of iris templates of the first image and the set of iris templates for the second image can be matched over different frequency bands using a particular defined weight for each of the frequency bands. The weight for each respective frequency band can depend on the difference between the modulation transfer function of sensor 102-1 and the modulation transfer function of sensor 102-2 over that respective frequency band, and image quality metrics (e.g., blur) over that respective frequency band. For instance, the closer the modulation transfer functions of sensors 102-1 and 102-2 match over a frequency band, the greater the weight for that frequency band. That is, the weight for a frequency band can capture the degree of similarity between sensors 102-1 and 102-2 over that frequency band.

Computing device 104 can account for the difference(s) between the image quality of the first and second images (e.g., match the irises in the first and second images for a plurality of frequency bands) by dividing the first and second images into a plurality of frequency bands, producing a plurality of iris templates from the first and second images for each frequency band, and determining (e.g., computing) a plurality of distances (e.g., Hamming distances) between the first and second images, wherein each distance corresponds to (e.g., is for) a different one of the plurality of frequency bands. The plurality of frequency bands can, for example, correspond to the plurality of frequency bands into which the modulation transfer functions of sensors 102-1 and 102-2 are divided. This multiband processing will be further described herein (e.g., in connection with FIG. 3). Computing device 104 can then determine whether the iris in the first image matches the iris in the second image based on (e.g., by evaluating) the distances between the first and second images.

Computing device 104 can further account for the difference(s) between the image quality of the first and second images (e.g., fuse the matched irises for each frequency band using the image quality of the first and second images) by fusing the distances between the first and second images using the image quality of the first and second images with a mixture of experts (e.g., a mixture of local experts) method (e.g., algorithm). For example, the mixture of local experts can determine (e.g., learn) a weight for each of the frequency bands based on a particular attribute, compute a plurality of weight based partitions over the attribute space, and fuse the distances between the first and second images by merging the weights in the regions of the attribute space. The particular attribute can be (e.g., the weight for each respective frequency band can be based on), for example, the image quality of the first and second images. For instance, the weight applied to the distances can depend on the amount of content (e.g., high frequency content) in the first and second images (e.g., the greater the amount of high frequency content in a frequency band, the greater the weight for that frequency band). An example of such a mixture of local experts method will be further described herein (e.g., in connection with FIG. 4).

Figure 2:
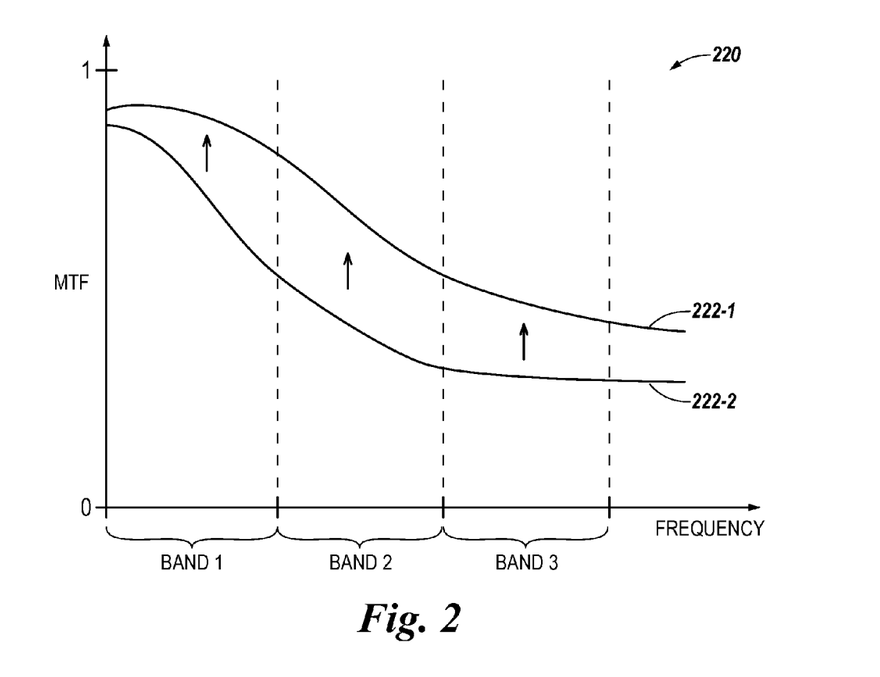
FIG. 2 is a graph illustrating an example of two modulation transfer functions in accordance with one or more embodiments of the present disclosure.

FIG. 2 is a graph 220 illustrating an example of two modulation transfer functions (e.g., modulation transfer functions 222-1 and 222-2) in accordance with one or more embodiments of the present disclosure. Modulation transfer functions (MTFs) 222-1 and 222-2 can be modulation transfer functions of two different sensors used to capture different images of an iris. For example, modulation transfer function 222-1 can the modulation transfer function of sensor 102-1 used to capture a first image of an iris as previously described in connection with FIG. 1, and modulation transfer function 222-2 can be the modulation transfer function of sensor 102-2 used to capture a second image of an iris as previously described in connection with FIG. 1.

The first image and the second image can be transformed such that the transformation corresponds to matching modulation transfer functions 222-1 and 222-2, as previously described herein (e.g., in connection with FIG. 1). For instance, in the example illustrated in FIG. 2, the second image can be sharpened to match the first image. However, embodiments of the present disclosure are not limited to such an example. For instance, in some embodiments, the images can be matched by adjusting both images (e.g., sharpening the second image and blurring the first image).

Further, the first image and the second image can be divided into a plurality of corresponding frequency (e.g., spatial frequency) bands, as previously described herein (e.g., in connection with FIG. 1). For instance, in the example illustrated in FIG. 2, the first and second images are divided into three frequency bands (e.g., band 1, band 2, and band 3). The images can then be matched over a single (e.g., only) one of the frequency bands, as previously described herein (e.g., in connection with FIG. 1). For example, an iris template can be generated for each of the frequency bands, a weight can be defined for each of the frequency bands, and the set of iris templates for the first image and the set of iris templates for the second image can be matched over different frequency bands using a particular defined weight for each of the frequency bands, as previously described herein (e.g., in connection with FIG. 1). The weight for each respective frequency band can depend on the difference between modulation transfer functions 222-1 and 222-2 over that respective frequency band, and image quality metrics (e.g., blur) over that respective frequency band, as previously described herein (e.g., in connection with FIG. 1). For instance, in the example illustrated in FIG. 2, the weight for frequency band 1 can be greater than the weights for frequency bands 2 and 3, because modulation transfer functions 222-1 and 222-2 are a closer match over frequency band 1 than over frequency bands 2 and 3, as illustrated in FIG. 2.

Figure 3:
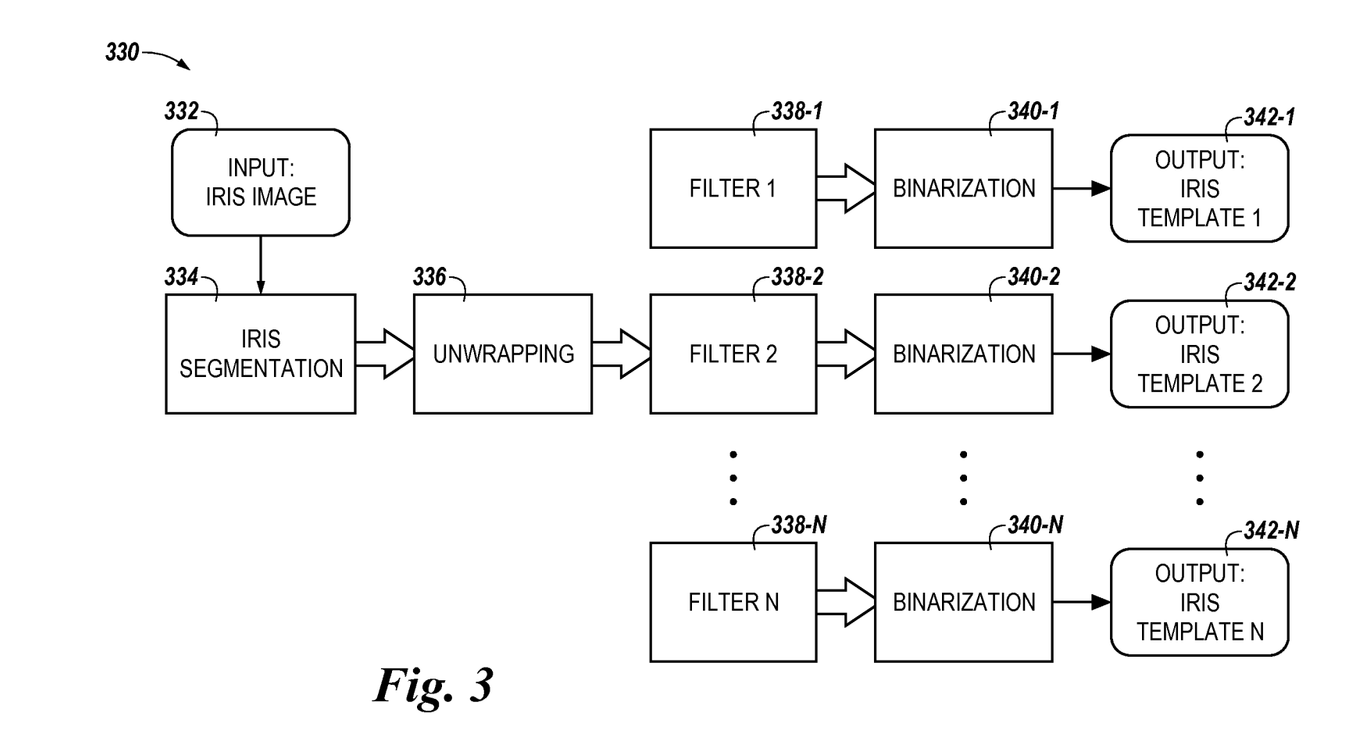
FIG. 3 illustrates a method for processing a plurality of frequency bands of an image in accordance with one or more embodiments of the present disclosure.

FIG. 3 illustrates a method 330 for processing a plurality of frequency bands of an image in accordance with one or more embodiments of the present disclosure. For example, method 330 can be used to account for a difference(s) between image quality of images captured using different sensors (e.g., match irises in the images for the plurality of frequency bands), as previously described herein (e.g., in connection with FIG. 1). The sensors can be, for example, sensors 102-1 and 102-2 previously described in connection with FIG. 1. Method 330 can be performed by, for example, computing device 104 previously described in connection with FIG. 1.

At block 332, an image of an iris is received (e.g., from sensor 102-1 or 102-2), and the location of the iris in the image can be found. At block 334, the iris is segmented out, and the iris is unwrapped at block 336.

At blocks 338-1, 338-2, . . . , 338-N, the unwrapped iris texture is filtered into a plurality of frequency bands. That is, the unwrapped iris texture is filtered into a first frequency band at block 338-1, a second frequency band at block 338-2, etc.

At blocks 340-1, 340-2, . . . , 340-N, the resulting phase information from each respective filtered frequency band is used to generate a binary encoded iris template for that frequency band. That is, the resulting phase information from the first frequency band is used to generate a binary encoded iris template for the first frequency band at block 340-1, the resulting phase information from the second frequency band is used to generate a binary encoded iris template for the second frequency band at block 340-2, etc.

At blocks 342-1, 342-2, . . . , 342-N, the iris templates generated for each respective frequency band are output. That is, the iris template generated for the first frequency band is output at block 342-1, the iris template generated for the second frequency band is output at block 342-2, etc. Accordingly, a plurality of iris templates can be produced from the image received at block 332.

Figure 4:
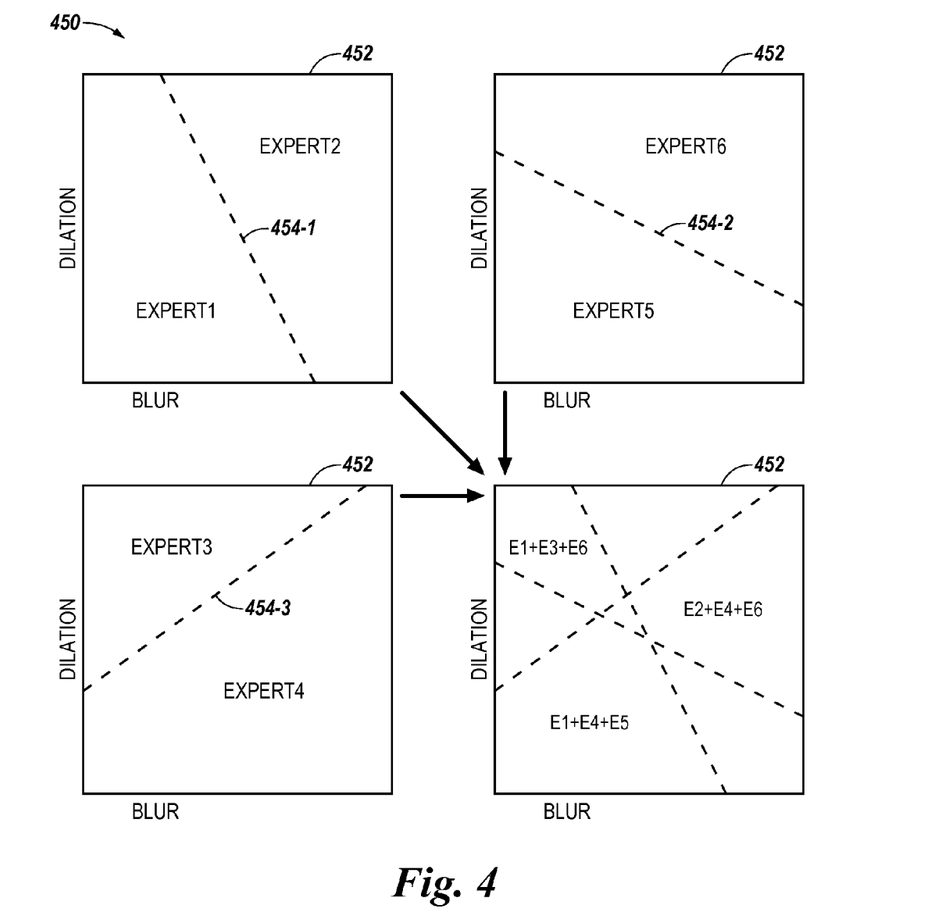
FIG. 4 illustrates a mixture of local experts method in accordance with one or more embodiments of the present disclosure.

FIG. 4 illustrates a mixture of local experts (MLE) method (e.g., algorithm) 450 in accordance with one or more embodiments of the present disclosure. For example, method 450 can be used to account for a difference(s) between image quality of images captured using different sensors (e.g., fuse the matched irises in the images for each frequency band using the image quality of the images), as previously described herein (e.g., in connection with FIG. 1). The sensors can be, for example, sensors 102-1 and 102-2 previously described in connection with FIG. 1. Method 450 can be performed by, for example, computing device 104 previously described in connection with FIG. 1.

In the example illustrated in FIG. 4, mixture of local experts method 450 includes (e.g., is performed on) a two dimensional attribute space 452 (e.g., iris dilation and blur). However, embodiments of the present disclosure are not limited to a particular number or type of attributes.

As shown in FIG. 4, mixture of local experts method 450 estimates partitions 454-1, 454-2, and 454-3 within attribute space 452 where the relative performance of the frequency bands change (e.g., a blur threshold where one frequency band becomes more reliable than another band). On each side of each partition, mixture of local experts method 450 weighs scores from each of the frequency bands and produces experts (e.g., Expert 1, Expert 2, Expert 3, Expert 4, Expert 5, and Expert 6) that can reduce (e.g., minimize) error on a training set. Although three partitions and expert pairs are produced in the example illustrated in FIG. 4, embodiments of the present disclosure are not limited to a particular number of partitions or expert pairs (e.g., mixture of local experts method 450 can produce any number of partitions and expert pairs within the attribute space).

Mixture of local experts method 450 can then merge the different weights in the regions of attribute space 452, as illustrated in FIG. 4. That is, mixture of local experts method 450 can combine the expert pairs to provide a fusion model over attribute space 452, as illustrated in FIG. 4.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for cross-sensor iris matching, comprising:
 a memory; and
 a processor configured to execute executable instructions stored in the memory to determine whether an iris in a first image captured by a first sensor matches an iris in a second image captured by a second sensor by accounting for a difference between characteristics of the first sensor and characteristics of the second sensor, wherein accounting for the difference between characteristics of the first sensor and characteristics of the second sensor includes:
dividing the first image and the second image into a plurality of corresponding frequency bands;
generating an iris template for each of the frequency bands;
matching a set of iris templates for the first image and a set of iris templates for the second image over different frequency bands using a defined weight for each of the frequency bands, wherein the weight for each respective frequency band depends on a difference between modulation transfer functions of the first and second sensor over that respective frequency band, and image quality metrics over that respective frequency band.

2. The computing device of claim 1, wherein the processor is configured to execute the instructions to determine whether the iris in the first image matches the iris in the second image based on:
an image quality of the first image; and
an image quality of the second image.

3. The computing device of claim 1, wherein the processor is configured to execute the instructions to:
receive the first image from the first sensor via a network; and
receive the second image from the second sensor via the network.

4. The computing device of claim 1, wherein:
the characteristics of the first sensor include optical characteristics of the first sensor; and
the characteristics of the second sensor include optical characteristics of the second sensor.

5. The computing device of claim 1, wherein the processor is configured to execute the instructions to determine whether the iris in the first image matches the iris in the second image based on a plurality of distances between the first image and the second image.

6. The computing device of claim 5, wherein each of the plurality of distances corresponds to a different frequency band into which the first image and the second image have been divided.

7. The computing device of claim 1, wherein the first sensor and the second sensor are different types of sensors.

8. A method for cross-sensor iris matching, comprising:
determining, by a computing device, whether an iris in a first image captured by a first sensor matches an iris in a second image captured by a second sensor based on:
a difference between an image quality of the first image and an image quality of the second image, wherein accounting for the difference between the image quality of the first image and the image quality of the second image includes:
dividing the first and second image into a plurality of frequency bands;
generating an iris template for at least one of the corresponding frequency bands;
determining a plurality of distances between the first and second image; and
determining whether the iris in the first image matches the iris in the second image based on the plurality of distances between the first and second images.

9. The method of claim 8, wherein the method includes determining, by the computing device, whether the iris in the first image matches the iris in the second image based on:
optical characteristics of the first sensor; and
optical characteristics of the second sensor.

10. The method of claim 8, wherein the method includes:
capturing, by the first sensor, the first image; and
capturing, by the second sensor, the second image.

11. The method of claim 8, wherein:
the image quality of the first image includes an amount of blur in the first image; and
the image quality of the second image includes an amount of blur in the second image.

12. The method of claim 8, wherein:
the image quality of the first image includes an amount of dilation in the iris in the first image; and
the image quality of the second image includes an amount of dilation in the iris in the second image.

13. The method of claim 8, wherein:
the image quality of the first image includes a contrast and sharpness of the first image; and
the image quality of the second image includes a contrast and sharpness of the second image.

14. The method of claim 8, wherein the method includes storing the first image and the second image in a database.

15. The method of claim 8, wherein:
the image quality of the first image includes an amount of occlusion and an amount of illumination in the first image; and
the image quality of the second image includes an amount of occlusion and an amount of illumination in the second image.

16. A non-transitory computer readable medium having computer readable instructions stored thereon that are executable by a processor to:
determine whether an iris in a first image captured by a first sensor matches an iris in a second image captured by a second sensor based on:
a difference between the characteristics of the first sensor and characteristics of the second sensor, wherein accounting for the difference between the characteristics of the first sensor and characteristics of the second sensor includes:
dividing the first and second image into a plurality of corresponding frequency bands;
generating an iris template for at least one of the corresponding frequency bands;
matching the first image and the second image over a single one of the frequency bands using the iris template for each of the corresponding frequency bands; and
an image quality of the first image and the image quality of the second image.

17. The computer readable medium of claim 16, wherein accounting for the difference between characteristics of the first sensor and the characteristics of the second sensor includes:
determining a modulation transfer function of the first sensor;
determining a modulation transfer function of the second sensor; and
matching the modulation transfer function of the first sensor and the modulation transfer function of the second sensor.

18. The computer readable medium of claim 16, wherein accounting for the difference between the image quality of the first image and the image quality of the second image includes fusing a plurality of distances between the first image and the second image using the image quality of the first image and the image quality of the second image.

\* \* \* \* \*